United States Patent
Shim et al.

(10) Patent No.: US 7,805,517 B2
(45) Date of Patent: Sep. 28, 2010

(54) SYSTEM AND METHOD FOR LOAD BALANCING A COMMUNICATIONS NETWORK

(75) Inventors: Choon B. Shim, Ijamsville, MD (US); Liehua Xie, Gaithersburg, MD (US)

(73) Assignee: Cisco Technology, Inc., San Jose, CA (US)

( * ) Notice: Subject to any disclaimer, the term of this patent is extended or adjusted under 35 U.S.C. 154(b) by 1426 days.

(21) Appl. No.: 10/941,070

(22) Filed: Sep. 15, 2004

(65) Prior Publication Data

US 2006/0069776 A1 Mar. 30, 2006

(51) Int. Cl.
*G06F 15/173* (2006.01)

(52) U.S. Cl. ............... 709/227; 709/226; 709/229; 709/205

(58) Field of Classification Search .......... 709/205, 709/227, 226, 229
See application file for complete search history.

(56) References Cited

U.S. PATENT DOCUMENTS

| | | | | |
|---|---|---|---|---|
| 5,805,824 | A * | 9/1998 | Kappe | 709/242 |
| 5,951,694 | A * | 9/1999 | Choquier et al. | 714/15 |
| 6,185,619 | B1 * | 2/2001 | Joffe et al. | 709/229 |
| 6,279,001 | B1 * | 8/2001 | DeBettencourt et al. | 707/10 |
| 6,330,707 | B1 * | 12/2001 | Shinomiya et al. | 716/14 |
| 6,829,643 | B1 * | 12/2004 | Tobe et al. | 709/226 |
| 7,050,963 | B2 * | 5/2006 | Flavin | 703/27 |
| 7,103,809 | B2 * | 9/2006 | Schlangen | 714/47 |
| 7,123,700 | B1 * | 10/2006 | Weaver et al. | 379/88.19 |
| 7,292,531 | B1 * | 11/2007 | Hill | 370/230.1 |
| 7,305,562 | B1 * | 12/2007 | Bianco et al. | 713/186 |
| 7,308,475 | B1 * | 12/2007 | Pruitt et al. | 709/203 |
| 7,340,598 | B2 * | 3/2008 | Esfahany | 713/100 |
| 7,363,378 | B2 * | 4/2008 | Holmes et al. | 709/227 |
| 7,475,108 | B2 * | 1/2009 | Di Giulio et al. | 709/203 |
| 7,565,656 | B2 * | 7/2009 | Yamasaki et al. | 718/104 |
| 2002/0038331 | A1 * | 3/2002 | Flavin | 709/105 |
| 2002/0090132 | A1 * | 7/2002 | Boncyk et al. | 382/154 |
| 2002/0152305 | A1 * | 10/2002 | Jackson et al. | 709/224 |
| 2002/0174220 | A1 * | 11/2002 | Johnson | 709/224 |
| 2002/0194326 | A1 * | 12/2002 | Gold et al. | 709/224 |
| 2003/0037145 | A1 * | 2/2003 | Fagan | 709/226 |
| 2003/0046412 | A1 * | 3/2003 | Tsunoda et al. | 709/229 |

(Continued)

OTHER PUBLICATIONS

Korzeniowski, Load Balancers: Balance the Trade-offs, Jan. 24, 2000, available at http://www.internetweek.com/indepth/indepth012400-1.htm.

(Continued)

*Primary Examiner*—Hassan Phillips
*Assistant Examiner*—Jonathan Bui
(74) *Attorney, Agent, or Firm*—Schwegman, Lundberg & Woessner, P.A.

(57) ABSTRACT

The invention relates to a system and method for load-balancing multiple servers in a communications network. Instead of using round robin or other predetermined scheme, SIP messages are forwarded to one of multiple SIP servers according to a performance score that is calculated from measured performance data. Advantageously, the disclosed system and method decreases signaling latency, improving overall communications speed. Moreover, where performance data indicates that a SIP server has failed, the performance score for the failed SIP server is zero, and the load balancer will not forward SIP messages to the failed SIP server. System uptime is also improved.

22 Claims, 15 Drawing Sheets

U.S. PATENT DOCUMENTS

| | | | |
|---|---|---|---|
| 2003/0051187 A1* | 3/2003 | Mashayekhi et al. | 714/4 |
| 2004/0024879 A1* | 2/2004 | Dingman et al. | 709/227 |
| 2004/0073639 A1* | 4/2004 | Basoglu et al. | 709/223 |
| 2004/0103194 A1* | 5/2004 | Islam et al. | 709/225 |
| 2004/0153549 A1* | 8/2004 | Naito et al. | 709/228 |
| 2004/0215787 A1* | 10/2004 | Gibson et al. | 709/227 |
| 2005/0027862 A1* | 2/2005 | Nguyen et al. | 709/225 |
| 2005/0038890 A1* | 2/2005 | Masuda et al. | 709/224 |
| 2005/0038989 A1* | 2/2005 | Esfahany | 713/100 |
| 2005/0066328 A1* | 3/2005 | Lam | 718/100 |
| 2005/0216729 A1* | 9/2005 | Joels et al. | 713/153 |
| 2005/0268155 A1* | 12/2005 | Mashayekhi et al. | 714/4 |
| 2005/0268156 A1* | 12/2005 | Mashayekhi et al. | 714/4 |
| 2007/0160033 A1* | 7/2007 | Bozinovski et al. | 370/352 |
| 2007/0260676 A1* | 11/2007 | Bozinovski et al. | 709/203 |
| 2009/0024425 A1* | 1/2009 | Calvert | 705/7 |

OTHER PUBLICATIONS

Performance Technologies, Tutorial Interworking Switched Circuits and Voice-Over-IP Networks, (2001), available at: http://www.pt.com/tutorials/iptelephony/tutorial_voip_sip.html.

Network World Fusion, SIP (Session Initiation Protocol) available at: http://www.nwfusion.com/details/500.html (first published in Network World Apr. 15, 2002).

Radvision, Session Initiation Protocol (SIP) (2000), available at: http://www.sipcenter.com/sip.nsf/html/WEBB5YFPVR/$FILE/SIPOverview.pdf.

Cisco Systems, High-Availability Solutions for SIP Enabled Voice-over-IP Networks (2002) available at: http://www.cisco.com/en/US/tech/tk652/td701/technologies_white_paper09186a00800a9818.shtml.

Vinod Bhat, Voice-Over-IP—The SIP Way, Apr. 2001, available at: .http://www.tcs.com/0_whitepapers/htdocs/VoiceOverIP-TheSIPway.pdf.

Giesa, et al., Building A Strong Foundation For SIP-Based Networks, Feb. 2002, available at: http://www.tmcnet.com/it/0202/0202ff5.htm.

Anderson et al., Performance Soars, Features Vary, Network World, Jun. 14, 1999, available at: http://www.nwfusion.com/reviews/0614rev.html.

* cited by examiner

| Scenario | Server | CPU Utilization | Free Memory(KB) | Performance Score | # of times selected |
|---|---|---|---|---|---|
| 1 | 10.10.1.213 | 1 | 60,456 | 70 | 9 |
| | 10.10.1.208 | 2 | 85,892 | 78 | 11 |
| 2 | 10.10.1.213 | 95 | 113,420 | 26 | 3 |
| | 10.10.1.208 | 0 | 125,549 | 76 | 17 |
| 3 | 10.10.1.213 | 2 | 57,612 | 87 | 15 |
| | 10.10.1.208 | 88 | 16,888 | 17 | 5 |
| 4 | 10.10.1.213 | 92 | 101,234 | 29 | 11 |
| | 10.10.1.208 | 89 | 95,425 | 28 | 9 |

FIG. 15

SYSTEM AND METHOD FOR LOAD BALANCING A COMMUNICATIONS NETWORK

FIELD OF INVENTION

The invention relates generally to the field of communications. More specifically, but not by way of limitation, the invention relates to a system and method for load balancing a Session Initiation Protocol (SIP) network for applications such as Voice Over Internet Protocol (VoIP) communications and Instant Messaging (IM).

BACKGROUND

Systems and methods are generally known for effecting signaling (control) data on a communications network. FIG. 1 is a block diagram of a functional architecture of a communications network, according to the prior art. As shown in FIG. 1, a SIP server 104 provides communications services such as routing SIP signaling messages between a source device 102 and a destination device 106. Source device 102 and/or destination device 106 may be, for example, a SIP-enabled telephone, a SIP PC (Personal Computer) client, a SIP-enabled gateway, or other device configured to originate or terminate a SIP session. FIG. 2 is a message sequence diagram of communications with a SIP server, according to the prior art. In particular, FIG. 2 illustrates signaling between the functional blocks in FIG. 1 using request and response message types: Invite and Bye are request messages; Ringing and OK are response messages.

In typical signaling applications, multiple SIP servers may be used (instead of a single SIP server 104) where the communications system also includes multiple sources and/or destination devices. But systems with multiple SIP servers have many disadvantages. For example, known systems may not be able to establish, modify, or terminate at least some SIP sessions where one or more SIP servers have failed. Moreover, requests may be received at SIP servers according to round-robin assignments or theoretical server capacity, resulting in inefficient processing of SIP messages. What is needed is a system and method for performance-based load balancing of SIP servers that can also adapt to one or more failed SIP servers in the system.

SUMMARY OF THE INVENTION

The invention relates to a system and method for load-balancing multiple servers in a communications network. SIP messages are forwarded to one of multiple SIP servers according to a performance score that is calculated from measured performance data from each of the multiple servers.

Embodiments of the invention provide a method for load-balancing a Session Initiation Protocol (SIP) network, including: receiving a SIP request from a source device; selecting one of a plurality of SIP servers based on a plurality of performance scores, each of the plurality of performance scores associated with a corresponding one of the plurality of SIP servers; and forwarding the SIP request to the selected SIP server.

Embodiments of the invention provide a method for polling a SIP server for performance data, including: receiving a data request for the performance data in a performance server; creating a persistent performance client in the performance server; opening a connection to an agent running on the SIP server; and issuing a request from the persistent performance client to the agent.

Embodiments of the invention provide a method responsive to a data request, including: creating a first controller, the first controller being configured to gather and cache performance data; and creating a server socket, the server socket being configured to determine whether a connection request has been received, the server socket being further configured to transmit the performance data.

Embodiments of the invention provide a method for load-balancing a Session Initiation Protocol (SIP) network, including: receiving a SIP request; generating a routing request based on the SIP request; generating a performance score request for each of a plurality of SIP servers based on the routing request; generating a performance data query to each of the plurality of SIP servers based on the performance score request; and receiving the performance data query in an agent in each of the plurality of SIP servers.

Embodiments of the invention provide a communication system, including: an interface to a source device; a load balancer coupled to the interface; a plurality of Session Initiation Server (SIP) servers coupled to the load balancer; and a performance server coupled to the load balancer and the plurality of SIP servers, the performance server configured to collect performance data from the plurality of SIP servers, the load balancer configured to calculate a performance score for each of the plurality of SIP servers based on the performance data, the load balancer further configured to direct a SIP request received from the first interface to a selected one of the plurality of SIP servers based on the performance score for each of the plurality of SIP servers.

Advantageously, the disclosed system and method decreases signaling latency, improving overall communications speed. Moreover, where performance data indicates that a SIP server has failed, the performance score for the failed SIP server is zero, and the load balancer will not forward SIP messages to the failed SIP server. So system uptime is also improved.

The features and advantages of the invention will become apparent from the following drawings and detailed description.

BRIEF DESCRIPTION OF THE DRAWINGS

Embodiments of the invention are described with reference to the following drawings, wherein:

FIG. 15 is an illustration of a test results table, according to an embodiment of the invention.

DETAILED DESCRIPTION

This section provides a top-level functional architecture, exemplary selection, routing and forwarding processes, a process for calculating a performance score, a process for collecting performance data, and a summary of empirical analysis. Sub-headings are used below for organizational convenience. The disclosure of any particular feature is not necessarily limited to any particular section, however.

Top Level Functional Architecture

Figure 1:
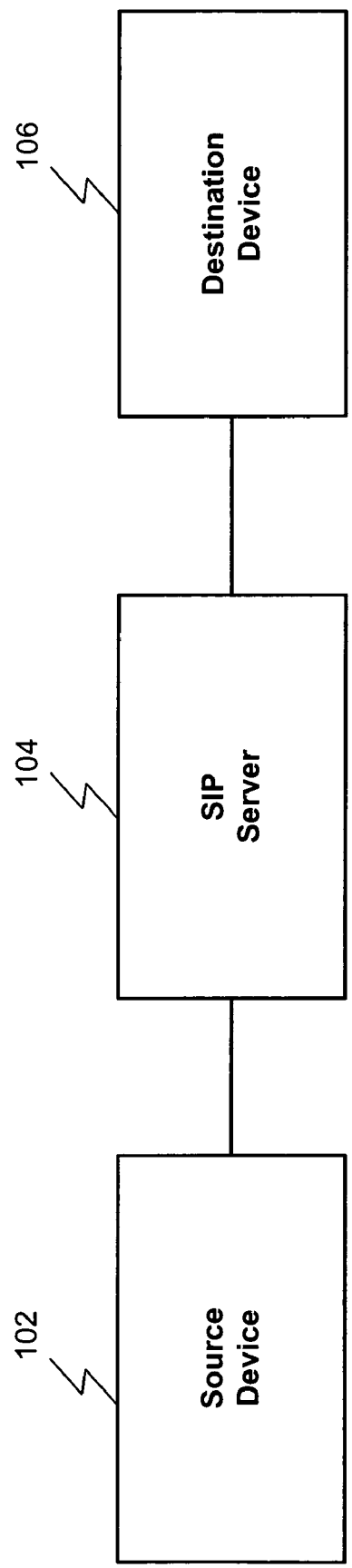
FIG. 1 is a block diagram of a functional architecture of a communications network, according to the prior art.
Figure 2:
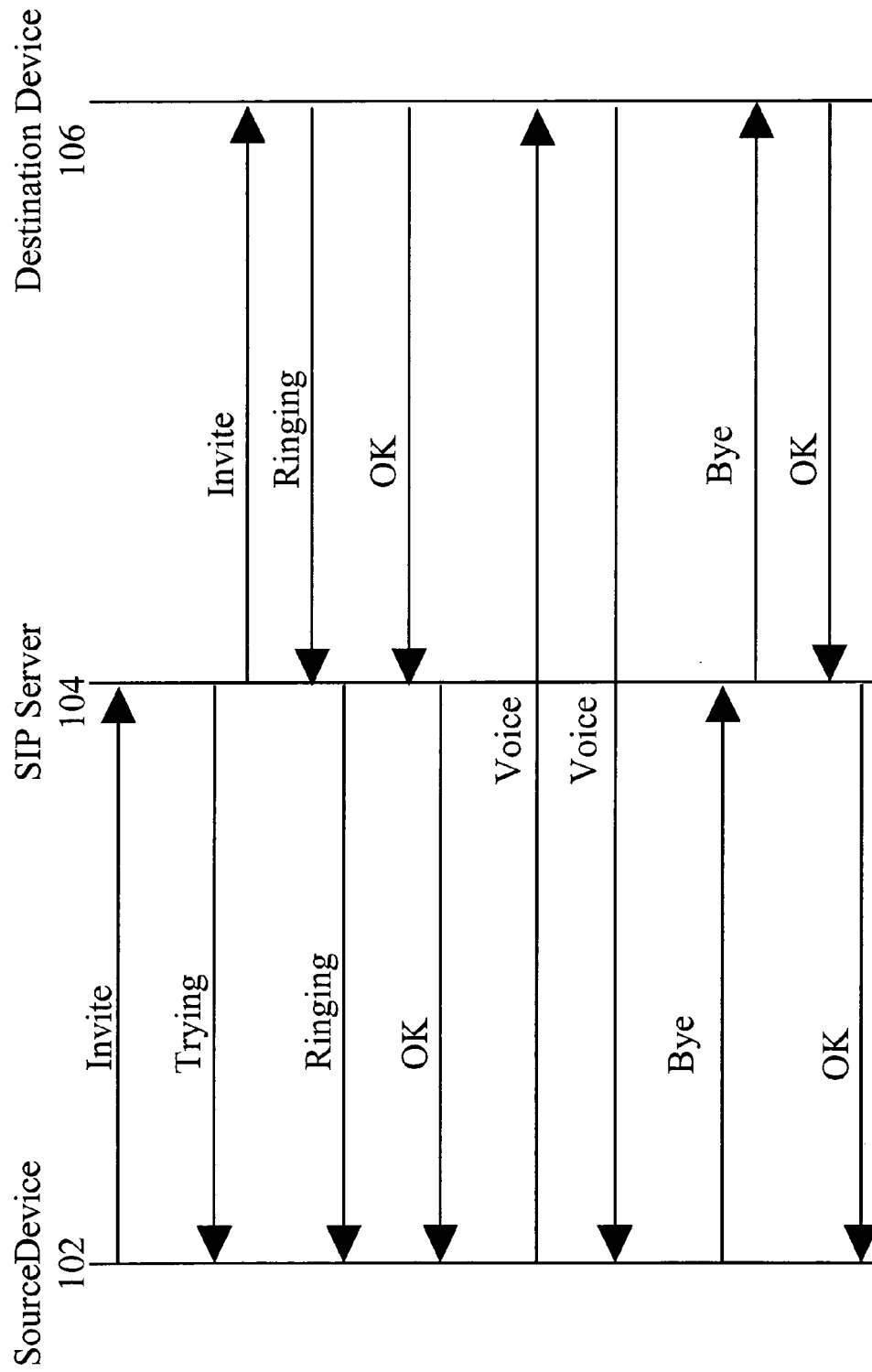
FIG. 2 is a message sequence diagram of communications with a SIP server, according to the prior art.
Figure 3:
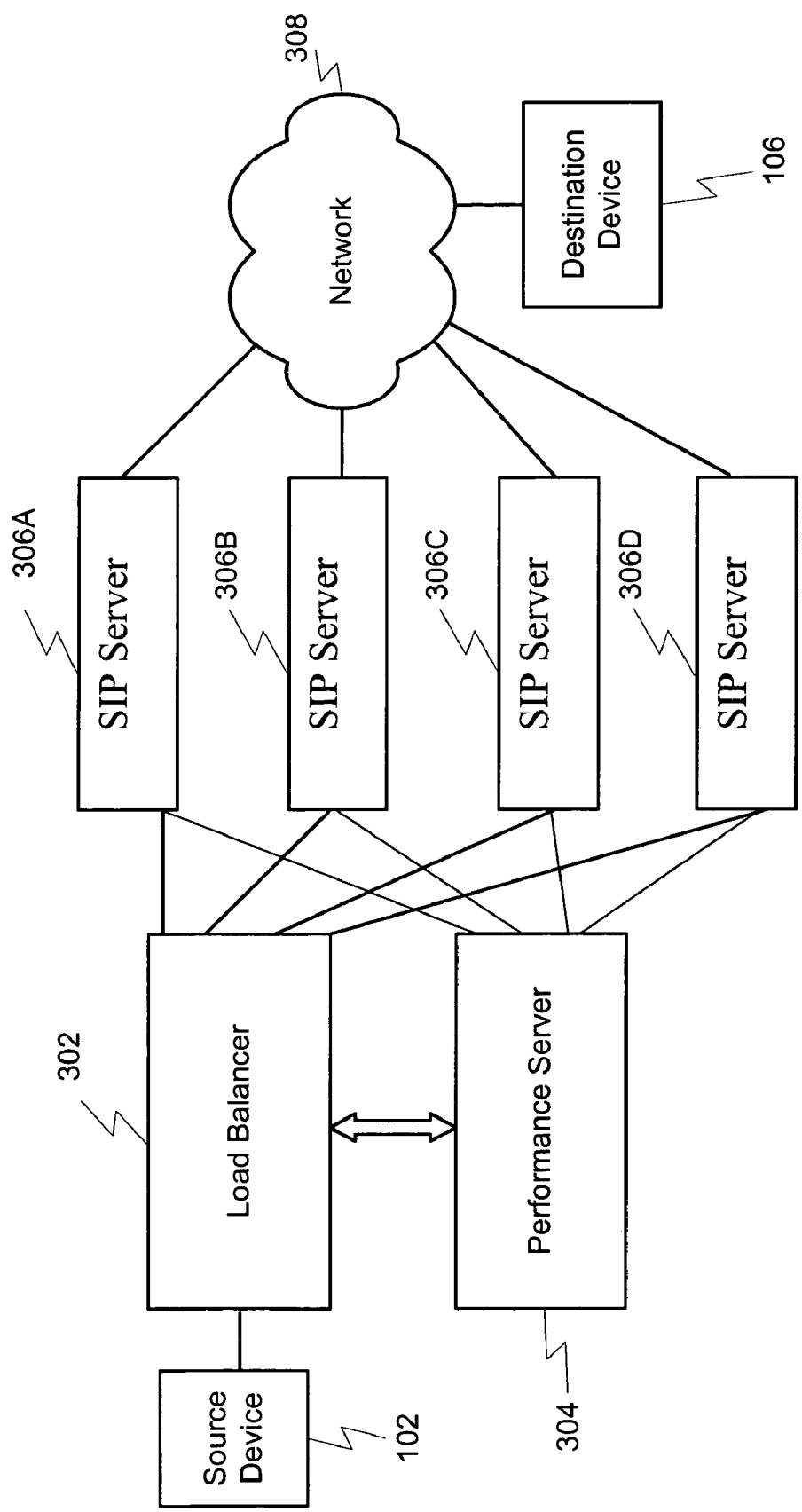
FIG. 3 is a block diagram of a functional architecture of a communications network, according to an embodiment of the invention.
Figure 4:
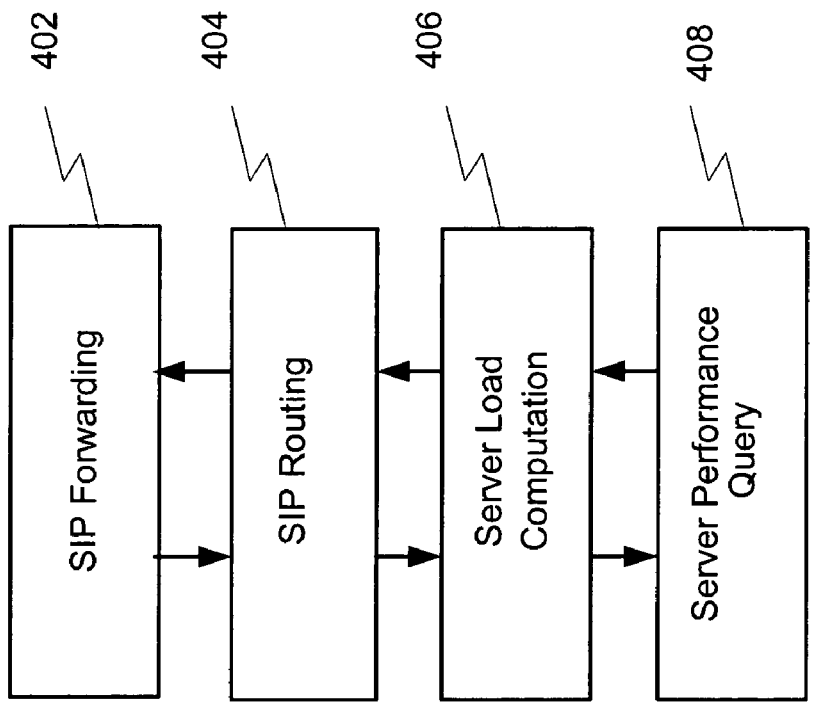
FIG. 4 is a block diagram of a functional architecture of the SIP load balancer in FIG. 3, according to an embodiment of the invention.

FIG. 3 is a block diagram of a functional architecture of a communications network, according to an embodiment of the invention. As shown in FIG. 4, a functional architecture includes source device 102, load balancer 302, performance server 304, SIP servers 306A, 306B, 306C, and 306D, a network 308, and a destination device 106. The load balancer 302 is coupled to the source device 102, the performance server 304, and each of the SIP servers 306A, 306B, 306C, and 306D. The performance server 405 is also coupled to each of the SIP servers 306A, 306B, 306C, and 306D. Further, network 308 is coupled to each of the SIP servers 306A, 306B, 306C, and 306D and the destination device 106.

The load balancer 302, performance server 304, SIP servers 306A, 306B, 306C, and 306D may each include a processor, each of the processors being configured to read and execute instructions from a processor-readable storage medium. In one variation, the load balancer 302 and the performance server 304 share a processor. The storage medium may be or include, for instance, a hard drive, Random Access Memory (RAM), or a Computer Disc (CD) Read Only memory (ROM). The load balancer 302, performance server 304, SIP servers 306A, 306B, 306C, and 306D may each be configured, for example, with a server operating system, examples of which include Linux™ or Windows™ server operating systems. SIP servers 306A, 306B, 306C and 306D may each be configured as SIP proxy servers.

The load balancer 302 is configured to receive a SIP message from source device 102. Informed by the performance server 304, the load balancer 302 is configured to forward the SIP message from the source device 102 to a selected one of the SIP servers 306A, 306B, 306C, and 306D. In turn, the selected SIP server establishes a session between the source device 102 and the destination device 106.

Variations of the functional architecture illustrated in FIG. 3 are also contemplated. For example, although four SIP servers are illustrated in FIG. 3, a functional architecture may have two or more SIP servers. Further, in a general case, a functional architecture may include multiple source devices and/or multiple destination devices. Moreover, switches or servers configured for H.323 or other IP telephony or other communications protocol could be used in the alternative to, or in combination with, the illustrated SIP servers 306A, 306B, 306C, and 306D, according to design choice.

FIG. 4 is a block diagram of a functional architecture of the SIP load balancer in FIG. 3, according to an embodiment of the invention. As shown therein, an exemplary load balancer 302 includes SIP forwarding module 402, SIP routing module 404, server load computation module 406, and server performance query module 408. The SIP routing module 404 is coupled to the SIP forwarding module 402 and the server load computation module 406. The server load computation module 406 is coupled to the SIP routing module 404 and the server performance query module 408. The server performance query module 408 is coupled to the server load computation module 406. In the illustrated embodiment, each of the couplings described above are two-way couplings.

The SIP forwarding module 402 is configured to receive a SIP request from the source device 102 and send an inquiry to the SIP routing module 404 to determine a SIP server recipient of the SIP message. Once the SIP forwarding module 402 receives the SIP server selection from the SIP routing module 404, the SIP forwarding module 402 is configured to forward the SIP request to the selected SIP server (e.g., one of SIP servers 306A, 306B, 306C, and 306D).

In response to a routing inquiry from the SIP forwarding module 402, the SIP routing module 404 is configured to request performance scores from the server load computation module 406, to select a SIP server (e.g., one of SIP servers 306A, 306B, 306C, and 306D) based on the performance scores, and forward the selection to the SIP forwarding module 402.

The server load computation module 406 is configured to receive a request for performance scores from the SIP routing module 404, request performance data from the server performance query module 408, calculate a performance score for each of the SIP servers 306A, 306B, 306C, and 306D based on the performance data, and provide the performance scores to the SIP routing module 404.

The server performance query module 408 is configured to receive a request for performance data from the server load computation module 406, solicit performance data from the performance server 304, and forward the performance data to the server load computation module 406.

Variations to the functional architecture illustrated in FIG. 4 are possible. For example, any of the functional capability illustrated therein and described above may be combined in functional groupings different from that illustrated in FIG. 4 and described above.

In operation, data may be cached or otherwise stored at various locations of the functional architecture. For instance, in response to a request for performance scores, server load computation module 406 may provide most recent performance scores to the SIP routing module 404 without having to first initiate a request for server performance data from the server performance query module 408. Likewise, in response to a request from the server load computation module 406, the server performance query module 408 may provide most recent server performance data to the server load computation module 406 prior to sending a request to the performance server 304.

Embodiments of processes performed by the functional components of the load balancer 302 are further described with reference to FIGS. 5-10 below.

Selection, Routing, and Forwarding Processes

Figure 5:
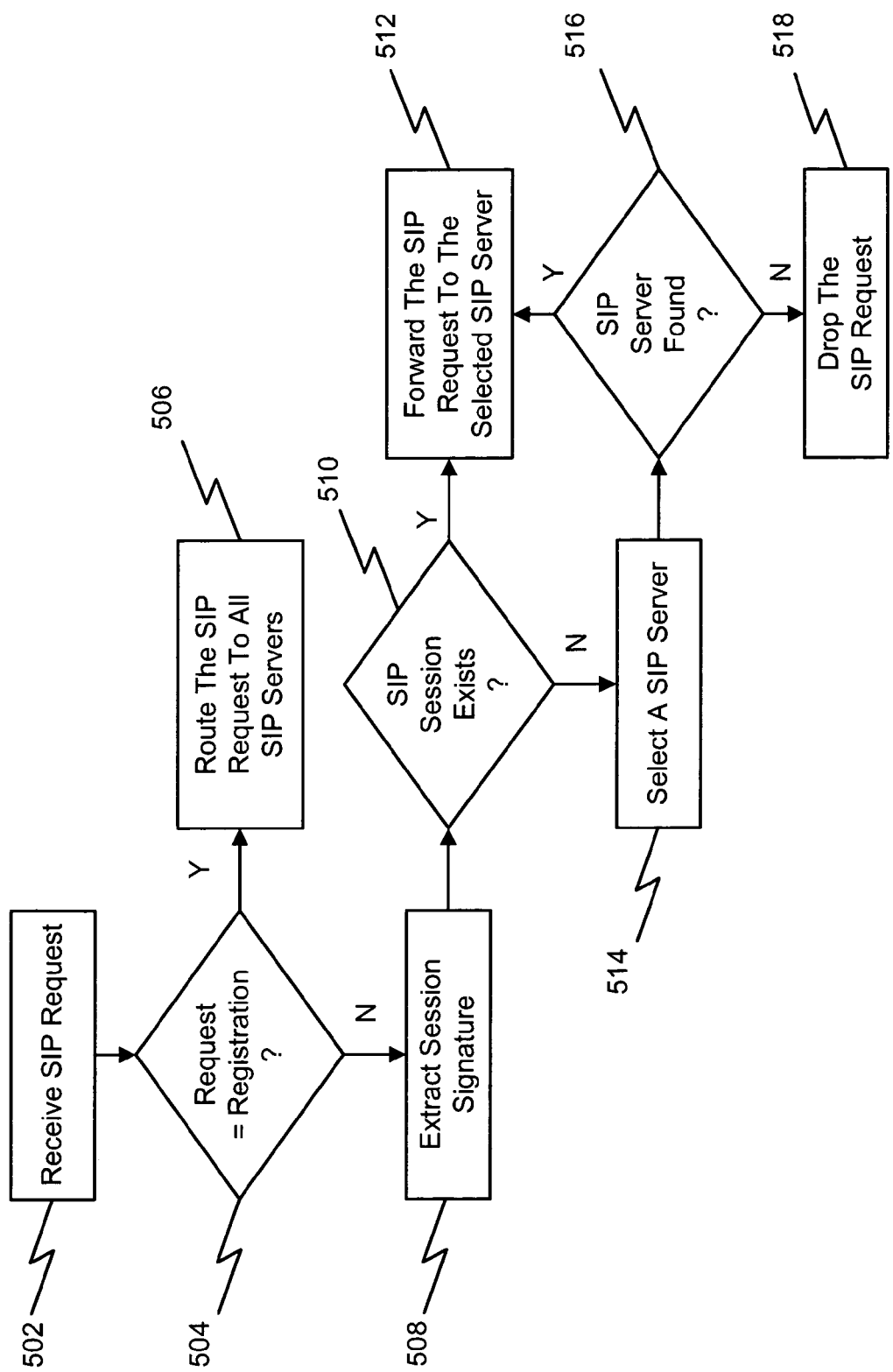
FIG. 5 is a flow diagram of a routing/forwarding process, according to an embodiment of the invention.

FIG. 5 is a flow diagram of a routing/forwarding process, according to an embodiment of the invention. As shown therein, the process begins by receiving a SIP request in step 502. The process then advances to conditional step 504 to determine whether the received request is a registration request. Where the result of conditional step 504 is in the affirmative, the process advances to step 506 to route the SIP request to all SIP servers. In an alternative embodiment, if the result of conditional step 504 is in the affirmative, the process routes the SIP request to a registrar server (step not shown).

On the other hand, where the result of conditional step 504 is in the negative, the process is promoted to step 508 to extract a session signature from the SIP request in step 508. The execution of step 508 may vary according to proprietary SIP implementation schemes. Then, in conditional step 510, the process determines whether a SIP session exists (e.g., based on the session signature). If it is determined in conditional step 510 that a SIP session exists (e.g., the SIP request is associated with an existing SIP session), then the process advances to step 512 to forward the SIP request to the (pre) selected SIP server associated with the existing SIP session. Accordingly, a SIP request associated with an active session is simply routed to the appropriate SIP server.

If it is determined in conditional step 510 that a SIP session does not exist (e.g., the request is associated with a new SIP session), then the process selects a SIP server in step 514 and advances to conditional step 516 to determine whether the selected SIP server has been found. Where the result of conditional step 516 is in the negative, the process advances to step 518 to drop (e.g., terminate processing of) the SIP request. Where the result of conditional step 516 is in the affirmative, the process advances to step 512 to forward the SIP request to the (newly) selected SIP server. Accordingly, a SIP request associated with a new session requires selection of a SIP server in step 514 before being forwarded to the selected SIP server in step 512. The load balancer 302 preferably maintains a list of active SIP sessions to execute conditional step 510 described above.

Variations to the process illustrated in FIG. 5 are contemplated. For example, conditional step 504 and associated step 506 are optional. In addition, conditional step 514 may be considered a portion of selection step 516.

Figure 6:
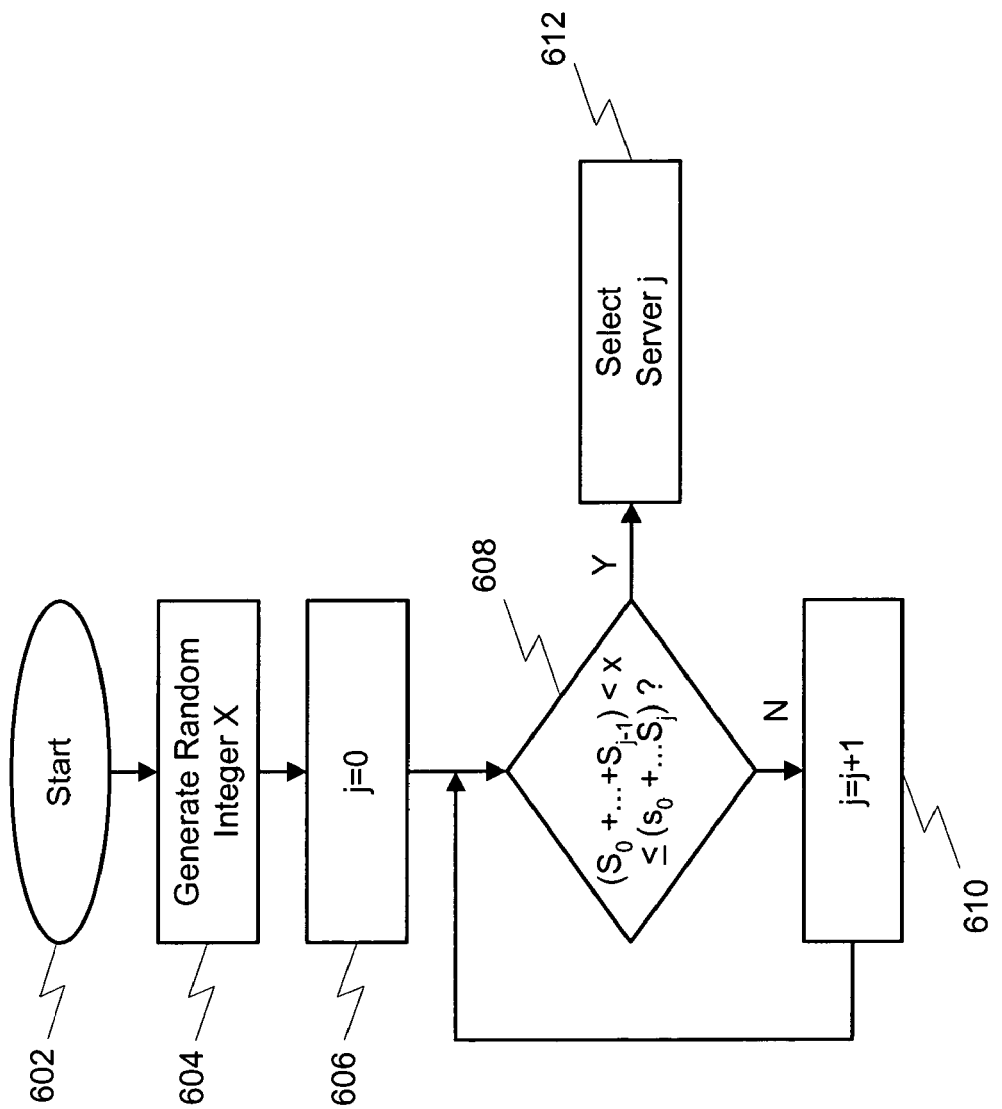
FIG. 6 is a flow diagram of a server selection process, according to an embodiment of the invention.

FIG. 6 is a flow diagram of a server selection process, according to an embodiment of the invention. In other words, FIG. 6 is one embodiment of selection step 514. As shown therein, the process begins in step 602, then advances to step 604 to generate a random integer X, where $0 < X \leq \Sigma S_k$. $\Sigma S_k$ is the sum of performance scores for all SIP servers (shown graphically on integer axis 702 of FIG. 7).

Next, j is set equal to zero in step 606, and conditional step 608 tests whether $(S_0 + \ldots + S_{j-1}) < X \leq (S_0 + \ldots S_j)$. $S_0$, $S_{j-1}$, and $S_j$ are the performance scores for servers 0 (S0), j−1, and j, respectively. If the result of conditional step 608 is negative, then the value of j is incremented by 1 in step 610, and the process returns to conditional step 608. If the result of conditional step 608 is positive, then the process selects server j in step 612.

Accordingly, the server selection process 514 illustrated in FIG. 6 tests one or more servers in steps 606, 608, and 610 to associate random integer X with a particular server j. The exemplary process illustrated in FIG. 6 can be further understood with reference to the server selection plot illustrated in FIG. 7.

Figure 7:
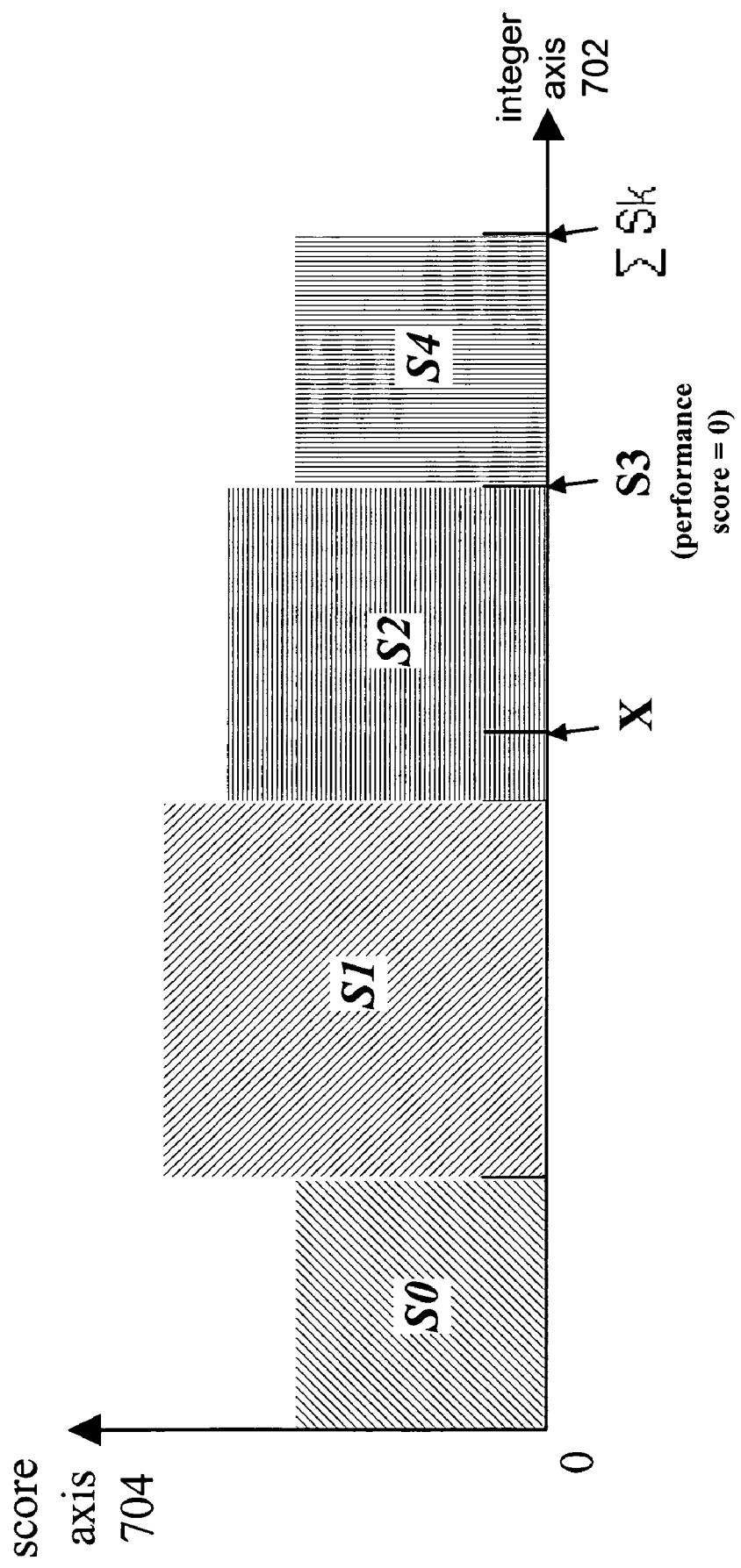
FIG. 7 is a graphical illustration of a server selection plot, according to an embodiment of the invention.

FIG. 7 is a graphical illustration of a server selection plot, according to an embodiment of the invention. As shown in FIG. 7, data for each of five servers, S0, S1, S2, S3, and S4 are plotted on integer axis 702 and score axis 704. The integer axis 702 is divided into N partitions sequentially assigned to servers S0, S1, S2, S3, and S4. For each server, the size of the partition along integer axis 702 is proportional to the performance score.

FIG. 7 further illustrates the position on the integer axis 702 for a random integer X generated in step 604. It should be apparent that the larger the performance score for a server, the larger the partition size, and the more likely that the random integer X will be associated with a server having a relatively larger performance score. It would be determined in step 608 (with reference to integer axis 702) that $(S_0 + S_1) < X \leq (S_0 + S_1 + S_2)$. Thus, server S2 would be selected.

The performance score $S_3$ associated with server S3 is represented by a single point on the integer axis 702. Note that the selection criteria in conditional step 608 prevents selection of a server having a performance score of zero. For example, if random integer X were equal to $S_0 + S_1 + S_2$, the point where it is indicated in FIG. 7 that the performance score for server S3 is equal to zero, server S2 would be selected by the process depicted in FIG. 6.

As described above, calculation of a performance score for each of the SIP servers is a prerequisite to selecting a SIP server in step 514.

Calculating a Performance Score

Figure 8:
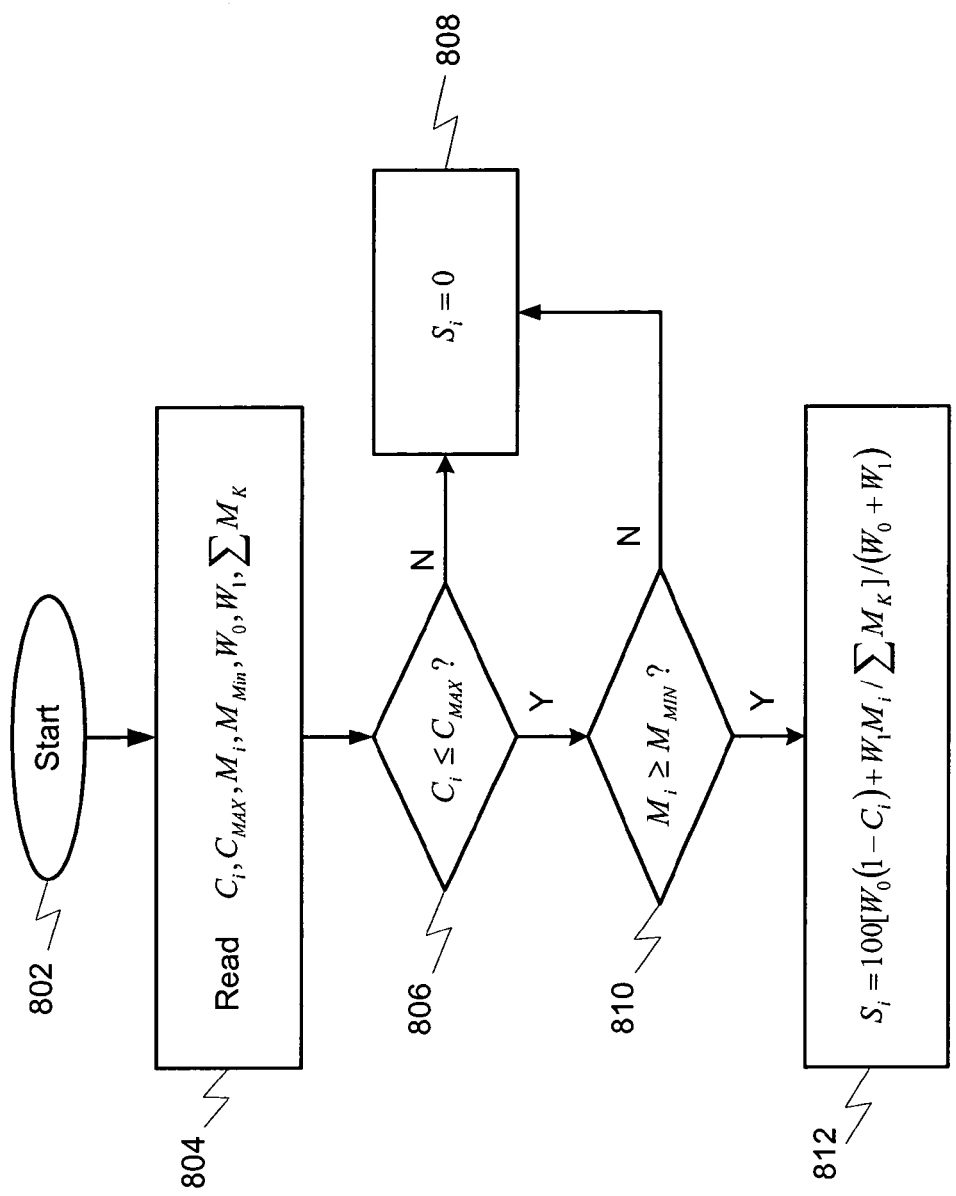
FIG. 8 is a flow diagram of a process for calculating server load, according to an embodiment of the invention.

FIG. 8 is a flow diagram of a process for calculating server load (or performance score), according to an embodiment of the invention. As shown therein, the process begins in step 802, then advances to step 804 to read each of several parameters. For example, in step 804, the process reads $C_i$, which is the Computer Processing Unit (CPU) usage, expressed as a percentage, for the $i^{th}$ SIP server. The process also reads $C_{max}$, which is the maximum CPU usage, also expressed as a percentage. Also in step 804, the process may read $M_i$, which is the amount of available memory of the $i^{th}$ SIP server, expressed as a percentage of total memory. Further, in step 804, the process reads $M_{min}$, which is the minimum required memory (again, expressed as a percentage of total memory). The process may also read or calculate $\Sigma M_k$, which is the sum of the available memory for all SIP servers with a non-zero performance score. Finally, in step 804, the process may read $W_0$ and $W_1$, which are the predetermined weight of the CPU usage percentage parameter and the predetermined weight of the memory availability parameter, respectively. In one embodiment, $C_{max}$ is 95%, $M_{min}$ is 10 Mbytes, and $W_0$ and $W_1$ are both set equal to 1.

After reading the parameters in step 804, the process advances to conditional step 806 where it is determined whether $C_i$ is less than or equal to $C_{max}$. Where the result of conditional step 806 is in the affirmative, the process advances to step 810 to determine whether $M_i$ is greater or equal to $M_{min}$. Where the result of either conditional step 806 or conditional step 810 are in the negative, the process terminates in step 808, where a performance score $S_i$ is set equal to zero. Where the result of conditional step 810 is in the affirmative, the process advances to step 812 to calculate the performance score $S_i$ given by: $S_i = 100(W_0(1-C_i) + W_1 M_i / \Sigma M_k)/(W_0 + W_1)$. Advantageously, scoring sensitivity can be adjusted by varying the predetermined weights $W_0$ and $W_1$ according to application requirements.

Figure 9:
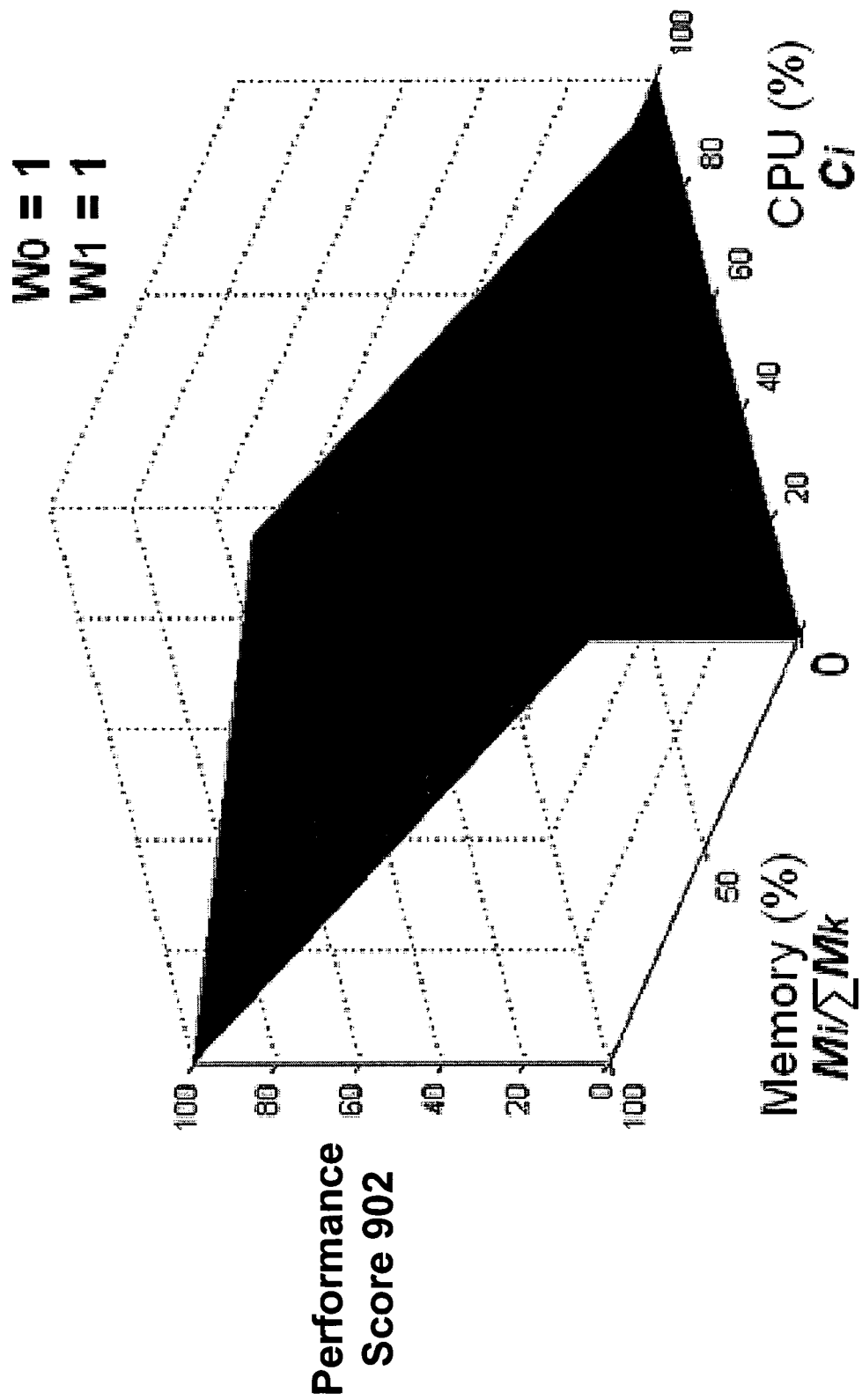
FIG. 9 is a graphical illustration of server load scores, according to an embodiment of the invention.

FIG. 9 is a graphical illustration of server performance scores 902, according to an embodiment of the invention. As shown, the highest performance score, 100%, is the case where CPU usage ($C_i$) is 0%, and memory availability ($M_i$) is 100%. As CPU and/or memory resources become less available, the performance score drops. Where the CPU usage ($C_i$) is 100%, and/or where the memory availability ($M_i$) is 0%, the performance score is equal to zero. In the illustrated embodiment, $W_0$ and $W_1$ are both set equal to 1. In alternative embodiments, the scoring solution can be made more sensitive to either memory availability or CPU utilization by changing the value of $W_0$ and/or $W_1$ either off-line or in-situ.

In alternative embodiments of the invention, the above calculation may be performed without a CPU usage parameter, or without a memory availability parameter. Moreover, in other embodiments, performance scores may be calculated based on network utilization, call volume, failure statistics (such as indications of server down status, or abnormal SIP session terminations), and/or other factors either separately or combined with CPU usage and/or memory availability so that multiple SIP servers can be load balanced based on one or more performance metrics, and/or so that fault tolerance can be provided to a SIP-based application.

Collecting Performance Data

Figure 10:
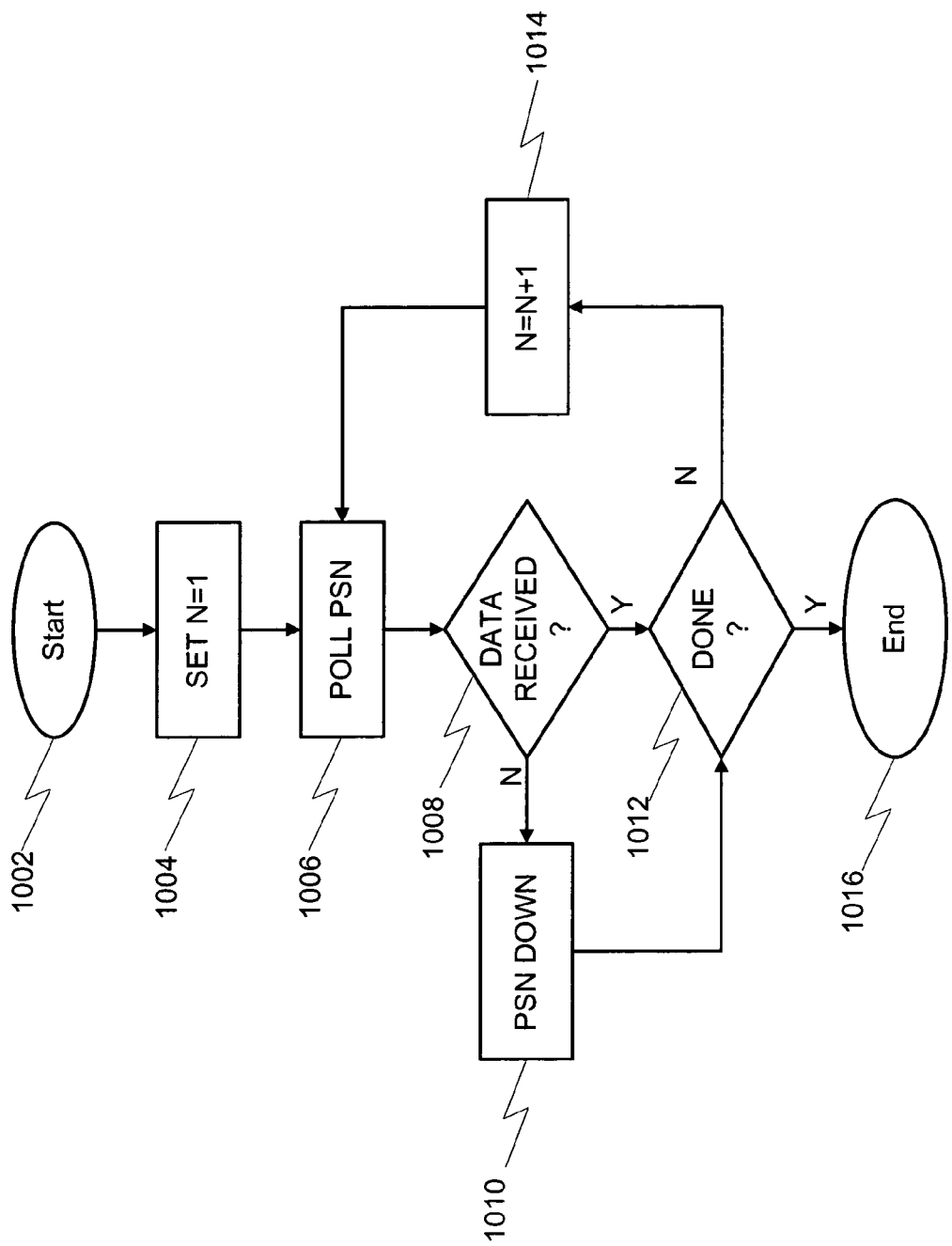
FIG. 10 is a flow diagram of a server performance query process, according to an embodiment of the invention.

FIG. 10 is a flow diagram of a server performance query process, according to an embodiment of the invention. As shown in FIG. 10, the process begins in step 1002, and then advances to step 1004 to set a parameter N equal to 1. Next, the process advances to step 1006 to poll a server PSN (the Nth SIP server). Then, the process advances to conditional step 1008 to determine whether the data being polled in step 1006 has been received. Where the result of conditional step 1008 is in the affirmative, the process advances to step 1012 to determine whether the query process of FIG. 10 is completed. If the result of conditional step 1012 is in the affirmative, the process terminates in step 1016.

Where the result of conditional step 1008 is in the negative, the process associates PSN with a down condition, and the process continues at conditional step 1012. Where the result of conditional step 1012 is in the negative, the process advances to step 1014 where the server number is incremented by a 1 and the process returns to polling step 1006.

Figure 11:
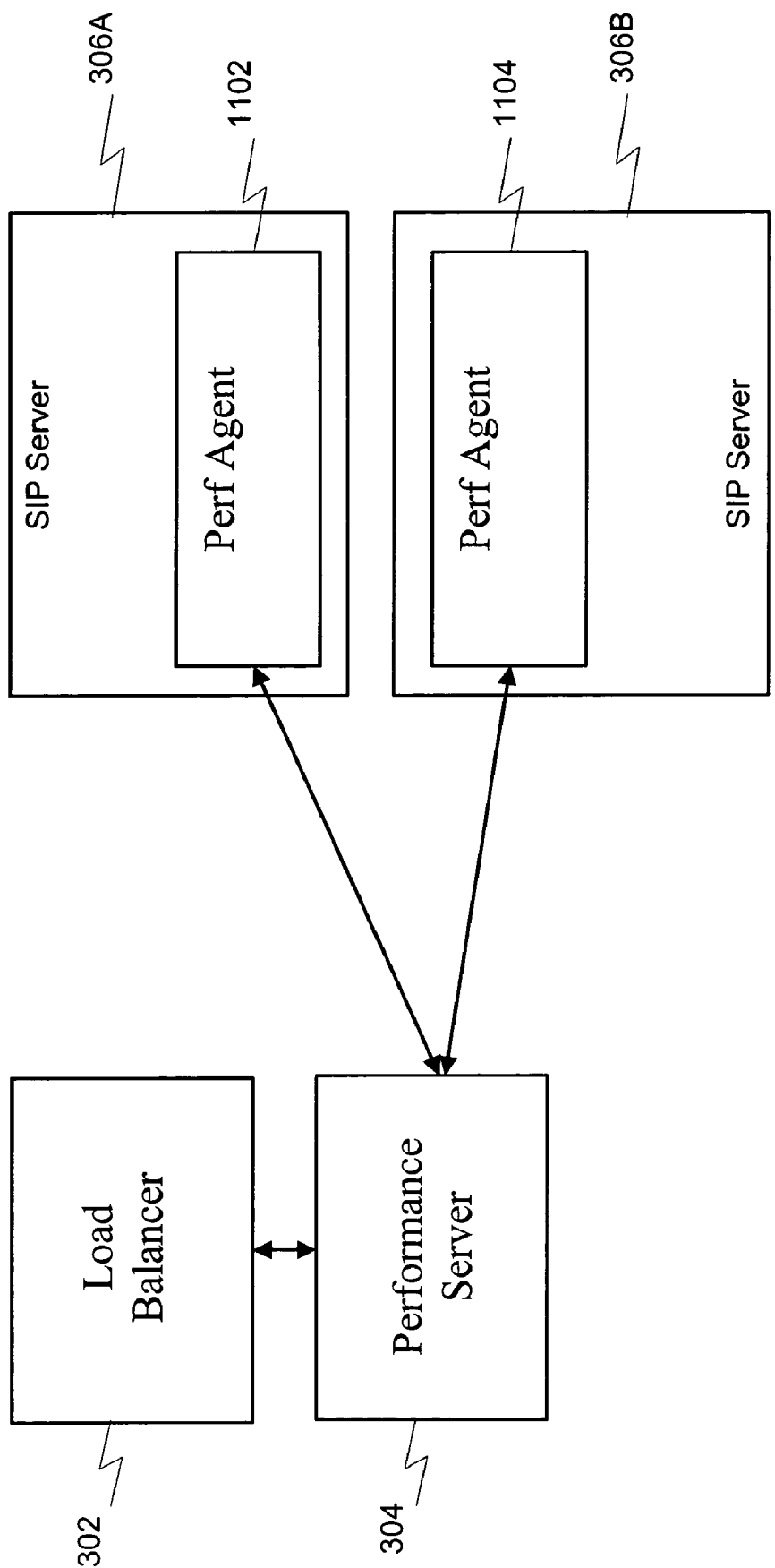
FIG. 11 is a block diagram of a functional architecture for collecting performance data, according to an embodiment of the invention.
Figure 12:
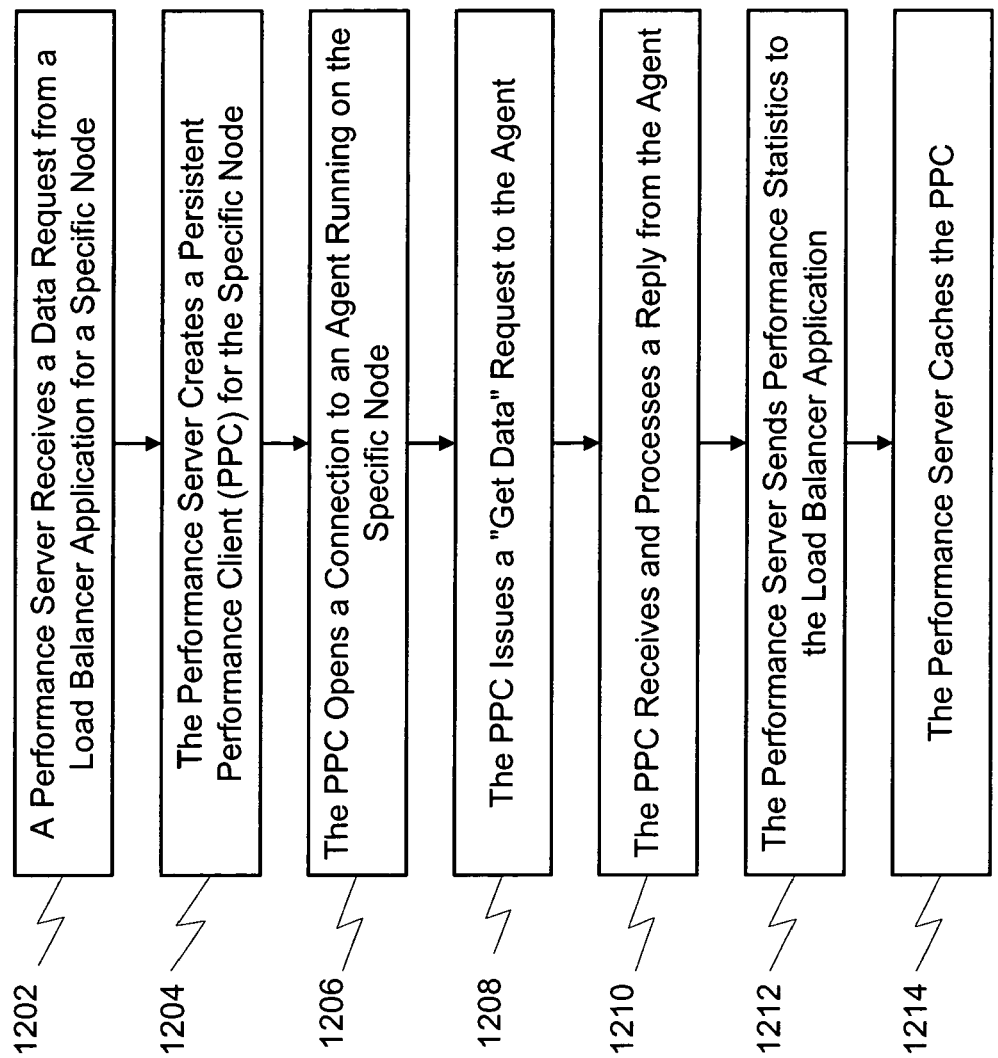
FIG. 12 is a flow diagram of a polling process from the perspective of a performance server, according to an embodiment of the invention.
Figure 13:
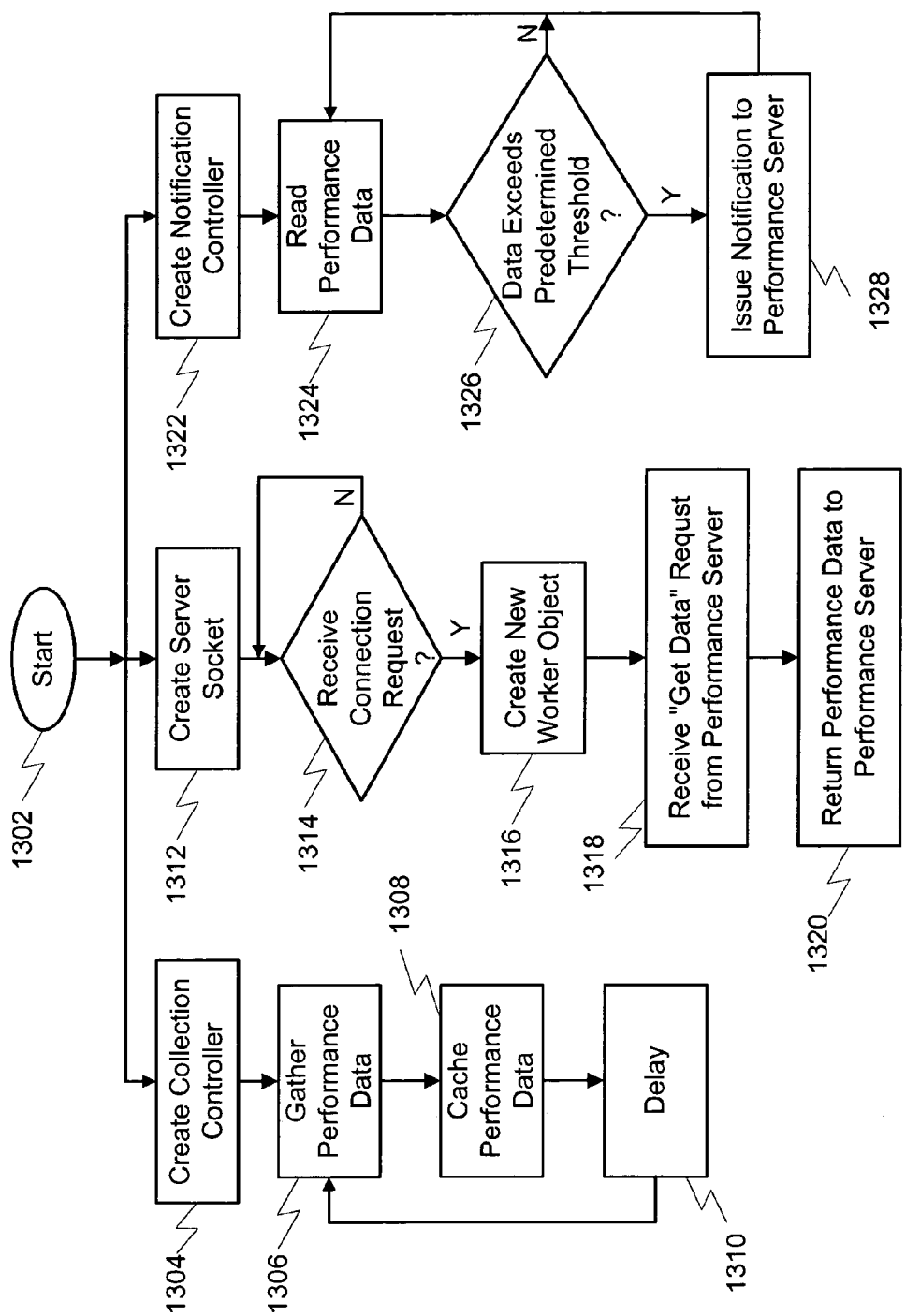
FIG. 13 is a flow diagram for a polling process from the perspective of a performance agent on a SIP server, according to an embodiment of the invention.

Accordingly, the process illustrated in FIG. 10 can be executed by the server performance query module 408 to collect server performance data for each of N SIP servers. FIGS. 11-13 illustrate one embodiment for retrieving the performance data being polled in step 1006.

FIG. 11 is a block diagram of a functional architecture for collecting performance data, according to an embodiment of the invention. As shown in FIG. 11, performance server 304 is coupled to performance agent 1102 in SIP server 306A and to performance agent 1104 in SIP server 306B.

FIG. 12 is a flow diagram of a polling process from the perspective of a performance server, according to an embodiment of the invention. As shown in FIG. 12, the process begins in step 1202 where performance server 304 receives a SIP request from load balancer 302 for a specific SIP server (e.g., SIP server 306A or SIP server 306B) or other node. Next, the process advances to step 1204 where the performance server 304 creates a persistent performance client (PPC) for the specified node. Next, the process advances to step 1206 where the PPC opens a connection to an agent (e.g., performance agent 1102 or performance agent 1104) running on the specified node. Then, in step 1208, the PPC issues a "get data" request to the agent. Next, in step 1210, the PPC receives and processes a reply from the agent. Then, in step 1212, the performance server 304 sends a performance statistics to the load balancer 302. Finally, in step 1214 the performance server 304 caches the PPC.

Thus, in one embodiment of the invention, performance data is collected by one or more performance servers using agents that are embedded in each of the SIP servers.

FIG. 13 is a flow diagram for a polling process from the perspective of a performance agent on a SIP server, according to an embodiment of the invention. As illustrated in FIG. 13, upon receipt of an initiation in step 1302, the process launches three separate and distinct processes: a create collection controller step 1304, a create server socket step 1312, and a create notification controller step 1322.

In response to the create collection controller step 1304, the process advances to gather performance data in step 1306, then cache performance data in 1308. After step 1308, the process may advance to a delay step 1310 before returning to step 1306 to gather additional performance data.

Subsequent to creating the server socket in step 1312, the process advances to conditional step 1314 to determine whether a connection request has been received from the performance server 304. Where the result of conditional step 1314 is in the affirmative, the process advances to step 1316 to create a new worker object. Next, in step 1318, the process receives a "get data" request from the performance server 304. Then, in step 1320, the process returns the performance data (which was gathered in step 1306 and cached in step 1308) to the performance server 304. Where the result of conditional step 1314 is in the negative, the process returns to conditional step 1314.

In response to the creation of a notification controller in step 1322, the process advances to step 1324 to read the performance data cached in step 1308. Next, the process advances to conditional step 1326 to determine whether the performance data exceeds a predetermined threshold. For example, a CPU utilization threshold may be set at 85%, and a memory availability threshold may be set at 10 MB. Where the result of step 1326 is in the affirmative, the process issues a notification to the performance server 304 in step 1328. Where the data does not exceed a pre-determined threshold in conditional step 1326, the process returns to step 1324 to read performance data.

Variations to the process illustrated in FIG. 13 are contemplated. For example, the implementation of delay step 1310 is optional. In addition, where the result of conditional step 1314 is in the negative, an optional delay step could be inserted before returning to conditional step 1314.

Empirical Analysis

Figure 14:
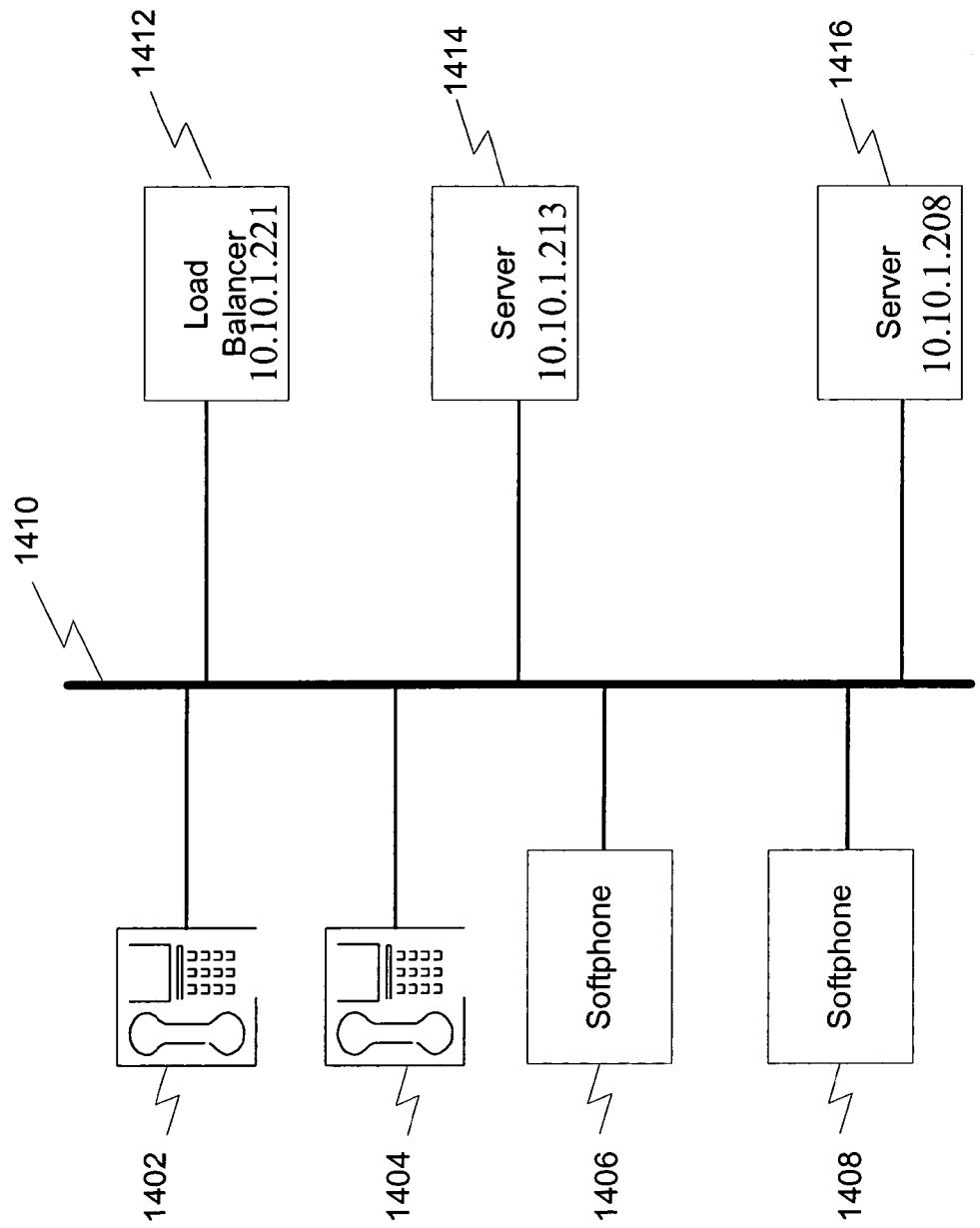
FIG. 14 is a block diagram of a test bed functional architecture, according to an embodiment of the invention.

Embodiments of the invention described above were tested using the architecture illustrated in FIG. 14. The test produced the results summarized in FIG. 15.

FIG. 14 is a block diagram of a test bed functional architecture, according to an embodiment of the invention. As shown, SIP telephones 1402 and 1404, softphones 1406 and 1408, Load balancer 1412, and SIP proxy servers 1414 and 1416 were coupled via link 1410. SIP telephones 1402 and 1404 were 3Com® SIP telephones, and softphones 1406 and 1408 were implemented with Microsoft Windows® Messenger running on laptop personal computers.

To initialize the test, SIP telephones 1402 and 1404, and softphones 1406 and 1408 were each registered with SIP proxy servers 1414 and 1416. Server 1414 was assigned address 10.10.1.213, and server 1416 was assigned address 10.10.1.208. In addition, phones 1402, 1404, 1406, and 1408 were each configured with load balancer 1412 address 10.10.1.221 as the outbound proxy address. A software tool was used to generate a controlled load on each of the SIP proxy servers 1414 and 1416, while signaling messages were generated using phones 1402, 1404, 1406, and 1408. Log messages in load balancer 1412 were later reviewed to determine the number of times that each SIP proxy server 1414 and 1416 were selected.

FIG. 15 is an illustration of a test results table, according to an embodiment of the invention. As shown therein, the test included four scenarios, 1-4.

In scenario 1, server 1414 and server 1416 were lightly loaded; the result was that the performance scores were similar, and load balancer 1412 selected servers 1414 and 1416 more or less equally. In scenario 2, server 1414 was heavily loaded, and server 1416 was lightly loaded; the result was that server 1416 was selected 17 out of 20 times. In scenario 3, server 1414 was lightly loaded, and server 1416 was heavily loaded; the result was that server 1414 was selected 15 out of 20 times. In scenario 4, server 1414 and server 1416 were both heavily loaded; the result was that servers 1414 and 1416 were selected more or less equally.

CONCLUSION

The invention described above thus overcomes the disadvantages of known systems and methods by balancing signaling load amongst multiple servers based on performance scores calculated from measured performance data. While this invention has been described in various explanatory embodiments, other embodiments and variations can be effected by a person of ordinary skill in the art without departing from the scope of the invention. For example, the systems and methods described herein could be applied to different signaling protocols or communication environments.

We claim:

1. A method for load-balancing a Session Initiation Protocol (SIP) network, comprising:
    receiving a SIP request from a source device;
    selecting one of a plurality of SIP servers including a first SIP server based on a plurality of performance scores, each of the plurality of performance scores determined as a function of a plurality of weighted performance parameters of a corresponding one of the plurality of SIP servers, the selecting including setting the performance score of the first SIP server equal to a predetermined value upon determination that a CPU percentage usage parameter of the first SIP server is greater than a first predetermined threshold or that a memory availability parameter of the first SIP server is less than a second predetermined threshold, the selecting including automatically generating a random integer and comparing the random integer with a sum of two or more of the performance scores for corresponding SIP servers, the selecting including detecting failures of the SIP servers using the performance scores, the selecting further including preventing the first SIP server from being chosen as a selected SIP server to perform the SIP request when the performance score of the first SIP server is the predetermined value; and
    forwarding the SIP request to the selected SIP server.

2. The method of claim 1, further comprising:
    before the selecting, determining whether the SIP request is a registration request; and
    if the SIP request is a registration request, routing the SIP request to all SIP servers.

3. The method of claim 1, further comprising:
    before the selecting, extracting a session signature from the SIP request;
    determining whether a SIP session exists based on the extracted session signature;
    if the SIP session exists, forwarding the SIP request to a SIP server associated with the existing SIP session.

4. The method of claim 1, wherein the random integer having a value greater than zero, the random integer having a value less than or equal to a sum of performance scores for the plurality of SIP servers.

5. The method of claim 4 further including identifying a server j satisfying the condition $(S_0 + \ldots + S_{j-1}) < X \leq (S_0 + \ldots + S_j)$, where $S_0$, $S_{j-1}$, and $S_j$ are the performance scores for servers 0, j-1, and j, respectively, and where X is the random integer.

6. The method of claim 1, wherein determining the plurality of performance scores includes:
    assigning a first weight to the CPU percentage usage parameter; and
    assigning a second weight to the memory availability parameter.

7. The method of claim 6, wherein the determining the plurality of performance scores includes solving $S_i = 100(W_0(1-C_i) + W_1 M_i/\Sigma M_k)/W_0 + W_1)$, where:
    $S_i$ is the performance score of an ith SIP server;
    $W_0$ is the first weight assigned to the CPU percentage usage parameter;
    $W_1$ is the second weight assigned to the memory availability parameter;
    $C_i$ is a CPU percentage usage of an ith SIP server;
    $M_i$ is an amount of available memory of the ith SIP server; and
    $\Sigma M_k$ is a sum of available memory of the plurality of SIP servers having non-zero performance scores.

8. The method of claim 1, wherein at least one of the plurality of performance scores is based, at least in part, on a call volume for each of the SIP servers.

9. The method of claim 1, wherein at least one of the plurality of performance scores is based, at least in part, on data associated with the failure of at least one of the plurality of SIP servers.

10. A method for polling a Session Initiation Protocol (SIP) server for performance data, comprising:
    receiving, in a performance server, a data request for the performance data of the SIP server, the performance data to be assigned a weight and used in determining a performance score of the SIP server, the performance score to detect a failure of the SIP server, the performance score of the SIP server to be set equal to a predetermined value upon determination that a CPU percentage usage parameter of the SIP server is greater than a first predetermined threshold or that a memory availability parameter of the SIP server is less than a second predetermined threshold;
    creating a persistent performance client in the performance server;
    opening a connection to an agent running on the SIP server; and
    issuing a request from the persistent performance client to the agent;
    wherein the performance score of the SIP server is to be added with performance scores for one or more other SIP servers to generate a sum of two or more of the performance scores for corresponding SIP servers, the sum to be compared with an automatically generated random integer to select an available SIP server to service an SIP request; and
    wherein the SIP server is prevented from being selected as the available SIP server when the performance score of the SIP server is the predetermined value.

11. The method of claim 10, further comprising:
receiving a reply from the agent in the performance server, the reply responsive to the request from the persistent performance client;
transmitting the reply from the performance server; and
caching the persistent performance client in the performance server.

12. A method responsive to a data request, comprising:
creating, in a Session Initiation Protocol (SIP) server, a first controller, the first controller being configured to gather and cache performance data, the performance data to be assigned a weight and used in determining a performance score of the SIP server, the performance score to detect a failure of the SIP server, the performance score of the SIP server to be set equal to a predetermined value upon determination that a CPU percentage usage parameter of the SIP server is greater than a first predetermined threshold or that a memory availability parameter of the SIP server is less than a second predetermined threshold; and
creating a server socket, the server socket being configured to determine whether a connection request has been received, the server socket being further configured to transmit the performance data;
wherein the performance score of the SIP server is to be added with performance scores for one or more other SIP servers to generate a sum of two or more of the performance scores for corresponding SIP servers, the sum to be compared with an automatically generated random integer to select an available SIP server to service an SIP request; and
wherein the SIP server is prevented from being selected as the available SIP server when the performance score of the SIP server is the predetermined value.

13. The method of claim 12, further comprising creating a second controller, the second controller configured to read the performance data, the second controller further configured to determine whether the performance data exceeds a predetermined threshold, the second controller further configured to issue a notification if the performance data exceeds a predetermined threshold.

14. A method for load-balancing a Session Initiation Protocol (SIP) network, comprising:
receiving a SIP request;
generating a routing request based on the SIP request;
generating a request for a performance score for each of a plurality of SIP servers including a first SIP server based on the routing request, each performance score to be determined as a function of a plurality of weighted performance parameters of a corresponding one of the plurality of SIP servers, the performance score to detect a failure of its corresponding SIP server, the performance score of the first SIP server to be set equal to a predetermined value upon determination that a CPU percentage usage parameter of the first SIP server is greater than a first predetermined threshold or that a memory availability parameter of the first SIP server is less than a second predetermined threshold;
generating a performance data query to each of the plurality of SIP servers based on the request for the performance score; and
receiving the performance data query in an agent in each of the plurality of SIP servers;
wherein a sum of two or more performance scores for corresponding SIP servers are to be compared with an automatically generated random integer to select an available SIP server to service the SIP request; and
wherein the first SIP server is prevented from being selected as the available SIP server when the performance score of the first SIP server is the predetermined value.

15. The method of claim 14, further comprising:
responding with performance data in response to the performance data query;
calculating the performance score for each of the plurality of SIP servers based on the performance data;
selecting a SIP server from the plurality of SIP servers based on the performance score for each of the plurality of SIP servers; and
forwarding the SIP request to the selected SIP server.

16. A machine-readable medium having instructions stored thereon for execution by a processor to perform a method comprising:
receiving a SIP request from a source device;
selecting one of a plurality of SIP servers including a first SIP server based on a plurality of performance scores, each of the plurality of performance scores determined as a function of a plurality of weighted performance parameters of a corresponding one of the plurality of SIP servers, the selecting including setting the performance score of the first SIP server equal to a predetermined value upon determination that a CPU percentage usage parameter of the first SIP server is greater than a first predetermined threshold or that a memory availability parameter of the first SIP server is less than a second predetermined threshold, the selecting including automatically generating a random integer and comparing the random integer with a sum of two or more of the performance scores for corresponding SIP servers, the selecting including detecting failures of the SIP servers using the performance scores, the selecting further including preventing the first SIP server from being chosen as a selected SIP server to perform the SIP request when the performance score of the first SIP server is the predetermined value; and
forwarding the SIP request to the selected SIP server.

17. A machine-readable medium having instructions stored thereon for execution by a processor to perform a method comprising:
receiving, in a performance server, a data request for the performance data of a Session Initiation Protocol (SIP) server, the performance data to be assigned a weight and used in determining a performance score of the SIP server, the performance score to detect a failure of the SIP server, the performance score of the SIP server to be set equal to a predetermined value upon determination that a CPU percentage usage parameter of the SIP server is greater than a first predetermined threshold or that a memory availability parameter of the SIP server is less than a second predetermined threshold;
creating a persistent performance client in the performance server;
opening a connection to an agent running on the SIP server; and
issuing a request from the persistent performance client to the agent;
wherein the performance score of the SIP server is to be added with performance scores for one or more other SIP servers to generate a sum of two or more of the performance scores for corresponding SIP servers, the sum to be compared with an automatically generated random integer to select an available SIP server to service an SIP request; and wherein the SIP server is prevented from being selected as the available SIP server when the performance score of the SIP server is the predetermined value.

18. A machine-readable medium having instructions stored thereon for execution by a processor to perform a method comprising:

creating, in a Session Initiation Protocol (SIP) server, a first controller, the first controller being configured to gather and cache performance data, the performance data to be assigned a weight and used in determining a performance score of the SIP server, the performance score to detect a failure of the SIP server, the performance score of the SIP server to be set equal to a predetermined value upon determination that a CPU percentage usage parameter of the SIP server is greater than a first predetermined threshold or that a memory availability parameter of the SIP server is less than a second predetermined threshold; and creating a server socket, the server socket being configured to determine whether a connection request has been received, the server socket being further configured to transmit the performance data;

wherein the performance score of the SIP server is to be added with performance scores for one or more other SIP servers to generate a sum of two or more of the performance scores for corresponding SIP servers, the sum to be compared with an automatically generated random integer to select an available SIP server to service an SIP request; and wherein the SIP server is prevented from being selected as the available SIP server when the performance score of the SIP server is the predetermined value.

19. A machine-readable medium having instructions stored thereon for execution by a processor to perform a method comprising:

receiving a Session Initiation Protocol (SIP) request;

generating a routing request based on the SIP request;

generating a request for a performance score for each of a plurality of SIP servers including a first SIP server based on the routing request, each performance score to be determined as a function of a plurality of weighted performance parameters of a corresponding one of the plurality of SIP servers, the performance score to detect a failure of its corresponding SIP server, the performance score of the first SIP server to be set equal to a predetermined value upon determination that a CPU percentage usage parameter of the first SIP server is greater than a first predetermined threshold or that a memory availability parameter of the first SIP server is less than a second predetermined threshold;

generating a performance data query to each of the plurality of SIP servers based on the request for the performance score; and receiving the performance data query in an agent in each of the plurality of SIP servers;

wherein a sum of two or more performance scores for corresponding SIP servers are to be compared with an automatically generated random integer to select an available SIP server to service the SIP request; and wherein the first SIP server is prevented from being selected as the available SIP server when the performance score of the first SIP server is the predetermined value.

20. A communication system, comprising:

an interface to a source device;

a load balancer coupled to the interface;

a plurality of Session Initiation Server (SIP) servers coupled to the load balancer, the plurality of SIP servers including a first SIP server; and a performance server coupled to the load balancer and the plurality of SIP servers, the performance server configured to collect performance data from the plurality of SIP servers, the load balancer configured to assign a weight to the performance data and calculate a plurality of performance scores, each of the plurality of performance scores associated with one of the plurality of SIP servers, the plurality of performance scores based on the weighted performance data, the performance score of the first SIP server to be set equal to a predetermined value upon determination that a CPU percentage usage parameter of the first SIP server is greater than a first predetermined threshold or that a memory availability parameter of the first SIP server is less than a second predetermined threshold;

wherein the load balancer is configured to automatically generate a random integer and compare the random integer with a sum of two or more of the performance scores for corresponding SIP servers to select one of the plurality of SIP servers, the load balancer further configured to direct a SIP request received from the first interface to the selected one of the plurality of SIP servers, the load balancer further configured to detect failures of the SIP servers using the performance scores, the load balancer further configured to prevent the first SIP server from being chosen as the selected SIP to perform the SIP request when the performance score of the first SIP server is the predetermined value.

21. The system of claim 20, wherein the load balancer includes:

a SIP forwarding module configured to forward the SIP request to the selected one of the plurality of SIP servers;

a SIP routing module coupled to the SIP forwarding module, the SIP routing module configured to select the selected one of the plurality of SIP servers based on the performance score for each of the plurality of SIP servers;

a server load computation module coupled to the SIP routing module, the server load module configured to calculate the performance score for each of the plurality of SIP servers based on the collected performance data; and a server performance query module coupled to the server load computation module, the server performance query module configured to fetch the performance data from the performance server.

22. The system of claim 20, wherein each of the plurality of SIP servers include a performance agent, the performance agent configured to provide the performance data to the performance server.

* * * * *

UNITED STATES PATENT AND TRADEMARK OFFICE
CERTIFICATE OF CORRECTION

PATENT NO. : 7,805,517 B2
APPLICATION NO. : 10/941070
DATED : September 28, 2010
INVENTOR(S) : Choon B. Shim et al.

It is certified that error appears in the above-identified patent and that said Letters Patent is hereby corrected as shown below:

In column 10, line 25, in Claim 7, delete "$C_1$" and insert -- $C_i$ --, therefor.

In column 14, line 8, in Claim 20, delete "Server" and insert -- Protocol --, therefor.

Signed and Sealed this

Thirtieth Day of November, 2010

David J. Kappos
*Director of the United States Patent and Trademark Office*